(12) United States Patent
Tada (10) Patent No.: US 7,745,994 B2
(45) Date of Patent: Jun. 29, 2010

(54) DISPLAY DEVICE WITH CONNECTION PORTIONS IN SAME REGION

(75) Inventor: Hiroshi Tada, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 231 days.

(21) Appl. No.: 11/954,166

(22) Filed: Dec. 11, 2007

(65) Prior Publication Data
US 2008/0137275 A1 Jun. 12, 2008

(30) Foreign Application Priority Data
Dec. 12, 2006 (JP) ............................... 2006-334407

(51) Int. Cl.
*H01J 1/62* (2006.01)
*H01J 63/04* (2006.01)

(52) U.S. Cl. .................................................... 313/506

(58) Field of Classification Search .......... 313/498–512
See application file for complete search history.

(56) References Cited

U.S. PATENT DOCUMENTS

| | | | |
|---|---|---|---|
| 6,819,045 | B2 | 11/2004 | Okita et al. |
| 2002/0071082 | A1 | 6/2002 | Okita et al. |
| 2002/0121860 | A1 * | 9/2002 | Seo et al. ..................... 313/506 |
| 2002/0158568 | A1 * | 10/2002 | Satake ......................... 313/493 |
| 2005/0082966 | A1 * | 4/2005 | Yamazaki et al. ............ 313/498 |
| 2005/0140265 | A1 * | 6/2005 | Hirakata ...................... 313/483 |
| 2005/0218791 | A1 * | 10/2005 | Kawase ........................ 313/500 |
| 2005/0236972 | A1 * | 10/2005 | Park et al. .................... 313/503 |
| 2006/0006794 | A1 * | 1/2006 | Sakakura et al. ............. 313/503 |
| 2006/0113894 | A1 * | 6/2006 | Fujii et al. ................... 313/499 |
| 2006/0119258 | A1 * | 6/2006 | Sakata et al. ................. 313/504 |
| 2006/0202615 | A1 * | 9/2006 | Murakami et al. ........... 313/506 |
| 2006/0255719 | A1 * | 11/2006 | Oikawa et al. ............... 313/503 |
| 2009/0026943 | A1 * | 1/2009 | Yuki ............................ 313/505 |

FOREIGN PATENT DOCUMENTS

| | | | |
|---|---|---|---|
| JP | 2002-82627 A | 3/2002 |
| JP | 2003-17245 A | 1/2003 |

* cited by examiner

*Primary Examiner*—Joseph L Williams
*Assistant Examiner*—Kevin Quarterman
(74) *Attorney, Agent, or Firm*—Birch, Stewart, Kolasch & Birch, LLP (57) ABSTRACT

The invention provides a display device including: a first electrode and a second electrode which are disposed in different directions from each other on a flexible substrate; an optical functional layer disposed between the first and second electrodes; and a display unit having a display pixel formed at a rectangular area of overlap between the first and second electrodes, in which the first and second electrodes are respectively connected to a first flexible wiring member at a first region of a periphery of the flexible substrate and a second flexible wiring member at a second region adjacent to the first region, one of the first and second flexible wiring members is adhered onto the display unit, and a first connection portion and a second connection portion for connecting the flexible wiring members with external drive units are disposed at the same region on the periphery of the flexible substrate.

13 Claims, 9 Drawing Sheets

FIG. 9 ize the
DISPLAY DEVICE WITH CONNECTION PORTIONS IN SAME REGION

CROSS-REFERENCE TO RELATED APPLICATION

This application claims priority under 35 USC 119 from Japanese Patent Application No. 2006-334407, the disclosure of which is incorporated by reference herein.

BACKGROUND OF THE INVENTION

1. Field of the Invention

The present invention relates to a display device having a functional element formed on a flexible substrate. More specifically, the present invention relates to a display device preferably used in a passive matrix drive mode.

2. Description of the Related Art

As a next-generation display or a next-generation device, paper-like flexible displays and flexible lighting have begun to receive considerable attention, which displays or devices are realized by laminating a transparent electrode, an optical functional layer including an organic light emitting element or a liquid crystal element, and a back electrode on a transparent and flexible substrate, and forming a plurality of display pixels. These flexible displays are thin, lightweight, and easily portable, and can be folded when not used and unfolded when used, or suchlike. To achieve a flexible display, a flexible substrate, robust display pixels, durability of the display, miniaturization of the display and the like, are required.

Solutions for accomplishing miniaturization and reduction of weight are disclosed in Japanese Patent Application Laid-Open (JP-A) Nos. 2002-82627 and 2003-17245, but the problems have not been solved sufficiently thus far. As a driving system of a flexible display, two methods have been studied, that is, a passive matrix drive mode and an active matrix drive mode. However, since it is generally difficult to manufacture a flexible thin film transistor (TFT) that exhibits sufficient performance on a flexible substrate such as polyethylene naphthalate (PEN), the passive matrix drive mode is expected to be an effective driving mode. However, in the case of control by the passive matrix drive mode, the amount of wiring to be connected to an external drive circuit is larger than when the active matrix drive mode is used. Hence, dead space is increased. Accordingly, a technique for reducing the space taken up by wiring is required.

Further, a display unit such as a display is constituted by a collection of multiple display pixels present on a region formed by two electrodes, that is, an anode and a cathode, disposed in intersecting directions and an optical functional layer disposed between the two electrodes. Since two electrodes are disposed in intersecting directions, in the case of a rectangular panel, for example, electrodes are respectively drawn out from two adjacent sides, connected to a drive unit using a flexible printed circuit (FPC) or the like, and controlled. The passive matrix drive mode is an effective driving method for a flexible display, but it requires a large amount of connecting wiring for driving, and a large space is required for the wiring.

To realize a flexible display, it is essential to minimize the space occupied by constituents of the display other than the display unit, and it is important to house the wiring portions in a smaller space.

SUMMARY OF THE INVENTION

In order to realize a flexible display that solves the above problems, the present invention provides a flexible display device with only a small amount of dead space.

According to a first aspect of the invention, there is provided a display device comprising:

a plurality of line electrodes including at least a first electrode and a second electrode, the first electrode and the second electrode being disposed in different directions from each other on or above a flexible substrate;

an optical functional layer disposed between the first electrode and the second electrode; and a display unit having a display pixel formed at each area of overlap between the first electrode and the second electrode in a direction substantially perpendicular to the plane of the electrodes, wherein the first electrode is connected to a first flexible wiring member at a first region at a periphery of the flexible substrate, the second electrode is connected to a second flexible wiring member at a second region at the periphery of the flexible substrate that is different from the first region, either the first flexible wiring member or the second flexible wiring member is adhered onto the display unit formed on the flexible substrate, and a first connection portion for connecting the first or second flexible wiring member adhered onto the display unit with a first or second external drive unit, and a second connection portion for connecting the other of the first or second flexible wiring member with the other of the first or second external drive unit are disposed at the same region at the periphery of the flexible substrate.

According to a second aspect of the invention, the flexible substrate is substantially rectangular.

According to a third aspect of the invention, the flexible wiring member adhered onto the display unit functions as a protective film for protecting the entire display unit.

According to the first and second aspects of the invention, the display device includes a first electrode and a second electrode which are respectively disposed in intersecting directions on or above a flexible substrate. The flexible substrate may be substantially rectangular. A display pixel is formed at an area of overlap between the two electrodes in a direction substantially perpendicular to the plane of the electrodes. The first electrode and the second electrode are respectively connected to flexible wiring members at a first region of a periphery of the flexible substrate and a second region adjacent to the first region. One of the flexible wiring members is adhered onto a display unit, the flexible wiring member connected to the second region is drawn out to the first region, and connection portions of two flexible wiring members are disposed at the same region as the first region at the periphery of the flexible substrate, similarly to the flexible wiring member connected to the first region, and may be connected externally. As a result, in the flexible display, the wirings are drawn out at only one region, and the dead space of the substrate is reduced, which is particularly advantageous in a hand-held display device.

Further, according to the third aspect of the invention, one of the flexible wiring members functions as a protective film, and covers the entire display unit. Therefore, the flexible wiring member may serve as a protective film of a flexible display. As a result, the number of parts may be reduced, and costs may be effectively reduced by thinning the display device and simplification of the manufacturing process.

According to a fourth aspect of the invention, the second electrode is divided into two sections on the surface of the display unit between the second region at the periphery of the flexible substrate and a third region at the periphery opposite to the second region to form a second electrode and a third electrode;

the first electrode is connected to the first flexible wiring member at the first region at the periphery of the flexible substrate;

the second electrode is connected to the second flexible wiring member at the second region at the periphery of the flexible substrate;

the third electrode is connected to a third flexible wiring member at the third region at the periphery of the flexible substrate;

two of the first flexible wiring member, the second flexible wiring member, and the third flexible wiring member are adhered onto the display unit; and the first connection portion for connecting the first flexible wiring member with the first external drive unit, the second connection portion for connecting the second flexible wiring member with the second external drive unit, and a third connection portion for connecting the third flexible wiring member with a third external drive unit are disposed at the same region at the periphery of the flexible substrate.

According to the fourth aspect of the invention, the display device includes at least a first electrode, and a second electrode and a third electrode, which are respectively disposed in intersecting directions on or above a flexible substrate. A display pixel is formed at an area of overlap between two of the electrodes in a direction substantially perpendicular to the plane of the electrodes. Drawn wiring portions are respectively disposed at a first region, a second region, and a third region at the periphery of the flexible substrate, which are adjacent with each other, and connected to flexible wiring members, and connection portions of the flexible wiring members and external drive units are connected, and further the flexible wiring members are adhered onto a display unit. The third flexible wiring member connected to the third region at the periphery and the second flexible wiring member connected to the second region at the periphery are drawn out to the first region at the periphery, and projected from the end of the first region at the periphery of the flexible substrate similarly to the first flexible wiring member connected to the first region at the periphery, and the three flexible wiring members may be connected in one direction. Adoption of the above configuration in a panel structure having a drawn wiring portion at the third region at the periphery is favorable. Further, in the flexible display, the wiring is drawn out at only one region at the periphery, and the dead space of the substrate is reduced, which is particularly advantageous in a hand-held display device.

According to a fifth aspect of the invention, the first electrode is divided into two sections on the surface of the display unit between the first region at the periphery of the flexible substrate and a fourth region at the periphery opposite to the first region at the periphery to form a first electrode and a fourth electrode;

the first electrode is connected to the first flexible wiring member at the first region at the periphery of the flexible substrate;

the fourth electrode is connected to a fourth flexible wiring member at the fourth region at the periphery of the flexible substrate:

the second electrode is connected to the second flexible wiring member at the second region at the periphery of the flexible substrate;

two of the first flexible wiring member) the fourth flexible wiring member, and the second flexible wiring member are adhered onto the display unit; and the first connection portion for connecting the first flexible wiring member with the first external drive unit, the second connection portion for connecting the second flexible wiring member with the second external drive unit, and a fourth connection portion for connecting the fourth flexible wiring member with a fourth external drive unit are disposed at the same region at the periphery of the flexible substrate.

According to the fifth aspect of the invention, the display device includes a first electrode and a fourth electrode, and a second electrode, which are respectively disposed in intersecting directions on or above a flexible substrate. A display pixel is formed at an area of overlap between the electrodes in a direction substantially perpendicular to the plane of the electrodes. Drawn wiring portions are disposed at a first region, a fourth region, and a second region at the periphery of the flexible substrate, which are adjacent to each other, and connected to the flexible wiring members, and connection portions of the flexible wiring members and external drive units are connected. Further, the flexible wiring members are adhered to a back side of the display device, the fourth flexible wiring member connected to the fourth region and the second flexible wiring member connected to the second region are drawn out to the first region, and projected from the end of the first region at the periphery of the flexible substrate similarly to the first flexible wiring member connected to the first region, and the three flexible wiring members may be connected at the same region. Adoption of the above configuration in a panel structure having a drawn wiring portion at the fourth region is favorable. Further, in the flexible display, the wiring is drawn out at only one region, and the dead space of the substrate is reduced, which is particularly advantageous in a hand-held display device.

According to a sixth aspect of the invention, one of the flexible wiring members has a function of the second flexible wiring member, is connected to an electrode at least at two regions of the periphery of the flexible substrate, and is adhered onto the display unit formed on the flexible substrate, and the one of the flexible wiring members protects the entire display unit.

According to the sixth aspect of the invention, one of the flexible wiring members functions as a protective film, and covers the entire display unit, thereby functioning as a protective film for the flexible display. As a result, the wiring provided on the second flexible wiring member and the third flexible wiring member of the third aspect, and the fourth flexible wiring member and the second flexible wiring member of the fourth aspect, may be provided on one flexible wiring member, and the flexible wiring members may be assembled as one member. Further, the wiring serves as a protective film by covering the entire display unit, and the number of parts is reduced, the display device is reduced in thickness, the manufacturing process is simplified, and costs are reduced.

According to a seventh aspect of the invention, the display unit is sealed with an insulating sealing film.

According to the seventh aspect of the invention, by sealing with an insulating sealing film, the display unit is isolated from oxygen or moisture in the atmosphere, and shorting of the wiring substrate adhered to the display unit and the electrodes of the display unit may be prevented.

According to an eighth aspect of the invention, the display unit is covered with a flexible protective film.

According to the eighth aspect of the invention, the flexible wiring member has the function of a protective film, whereby the number of parts is reduced, and the display device is reduced in thickness.

According to a ninth aspect of the invention, the display device is controlled by passive matrix driving.

Since the amount of wiring is larger in passive matrix driving and dead space is larger, the display device according to the eighth aspect of the invention is more effective in passive matrix driving.

According to a tenth aspect of the invention, the optical functional layer is an organic electroluminescence element including an organic compound and a light emitting layer.

Since the organic electroluminescence (EL) element has an organic functional layer interposed between upper and lower electrodes, the display device according to the ninth aspect of the invention is effective.

According to an eleventh aspect of the invention, the flexible wiring members are transparent, and the electrodes provided on the flexible wiring members are transparent.

According to the eleventh aspect of the invention, manufacture of a display device having optical functional elements of a top emission type or a two-side luminous type is realized.

According to the invention, the flexible wiring members are adhered onto the display unit, the second flexible wiring member, which out of the adjacent first region and second region on the periphery of the flexible substrate is connected to the second region, is drawn out to the first region of the flexible substrate, and is projected from the end of the first region of the flexible substrate similarly to the first flexible wiring member that is connected to the first region, and hence the two flexible wiring members are connected at one region, and the flexible wiring members are assembled at one region at a periphery of the flexible substrate, and, spatially, dead space additional to the display unit is eliminated.

DETAILED DESCRIPTION OF THE INVENTION

Hereinafter, exemplary embodiments of the present invention are described with reference to the drawings.

First Exemplary Embodiment

Figure 1A:
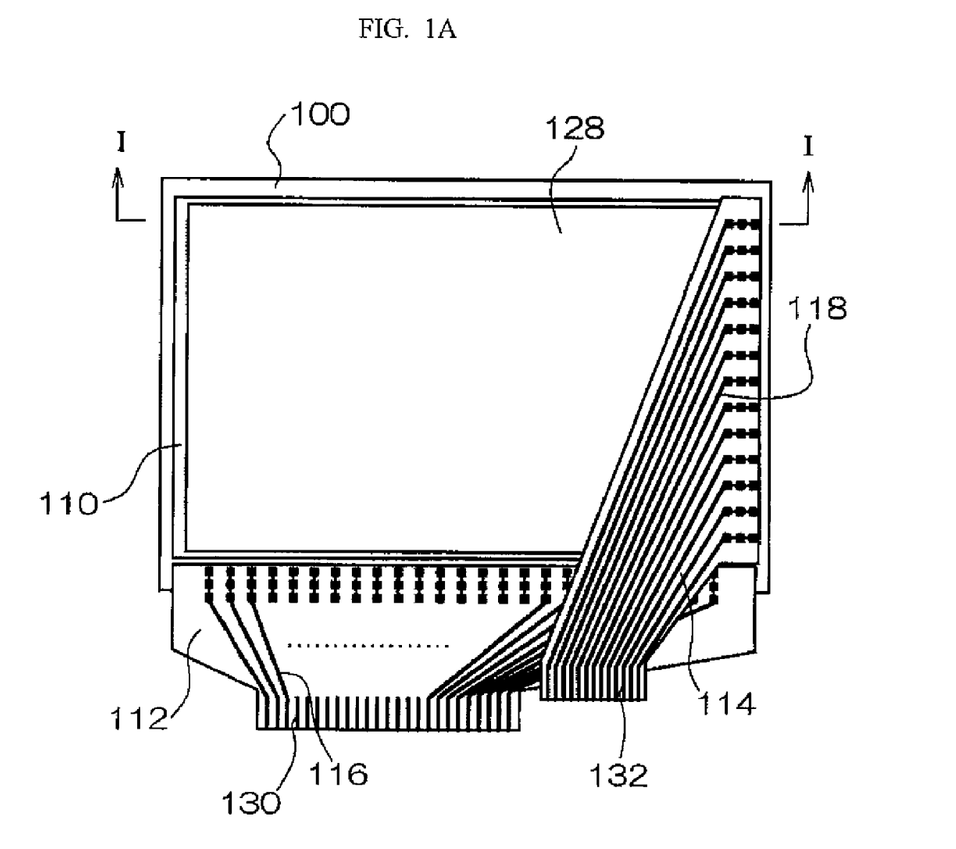
FIG. 1A is a plan view of a display device according to a first exemplary embodiment of the present invention.
Figure 1B:
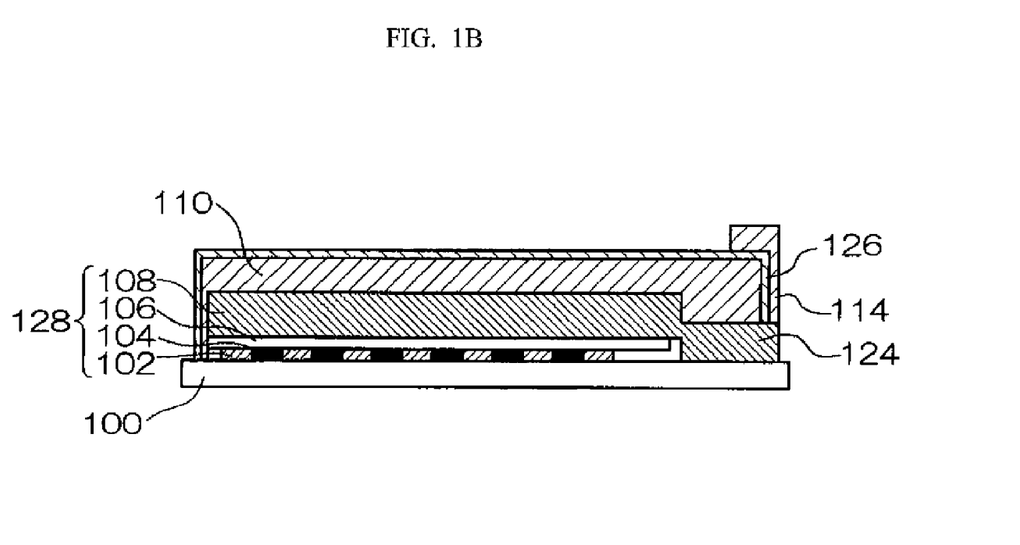
FIG. 1B is a sectional view taken along a line I-I in FIG. 1A.

FIG. 1A is a plan view showing a first exemplary embodiment of the invention. FIG. 1B is a sectional view of the first exemplary embodiment taken along the line I-I in FIG. 1A, and FIG. 2 is an explanatory diagram showing the layout of the wiring in FIG. 1A.

On a substantially rectangular flexible substrate 100, Faust electrodes 102 each having a strip shape are disposed in a row to form line electrodes. An organic layer 106 including an organic compound, such as a light emitting layer, is laminated on the first electrodes 102. Second electrodes 108 each having a strip shape are disposed in a row on the organic layer 106 in a direction intersecting that of the first electrodes 102 such that the organic layer 106 is interposed between the first electrodes 102 and the second electrodes 108, the second electrodes 108 forming line electrodes. Each rectangular area of overlap between the first electrodes 102 and the second electrodes 108 in a direction substantially perpendicular to the plane of the electrodes forms a display pixel 120, and a plurality of the display pixels 120 forms a display unit 128. The display unit 128 is covered with an insulating sealing film 110, and a protective film 126 for protecting the entire structure of the display unit 128 is adhered thereto in such a manner that the periphery of the protective film is substantially aligned and overlapped with that of the flexible substrate 100. A first drawn wiring 122 and a second drawn wiring 124 which are respectively drawn out from the first electrode 102 and the second electrode 108 from a display pixel (functional region) 120 of the display unit are not covered with the protective film 126. The first drawn wiring 122 is connected to a first flexible wiring member 112, and the second drawn wiring 124 is connected to a second flexible wiring member 114.

Figure 2:
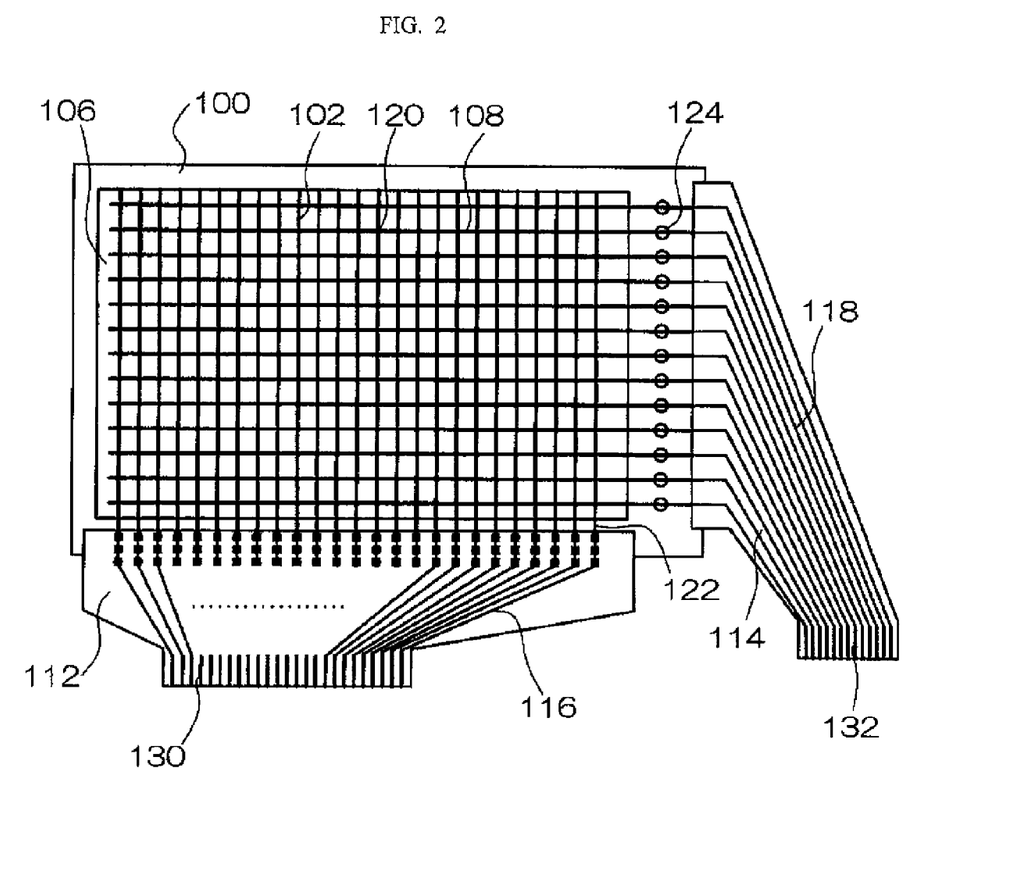
FIG. 2 is an explanatory diagram showing the layout of wiring in FIG. 1A of the display device according to the first exemplary embodiment of the invention.

As shown in FIG. 2, the first flexible wiring member 112 is drawn out to the same side as the first drawn wiring 122, and projects from one of a first side and a second side adjacent to each other on the periphery of the flexible substrate 100. Wiring 116 attached to the first flexible wiring member 112 is connected to a first connection portion 130 for an external drive unit. Further, the second flexible wiring member 114 is attached to the protective film 126. At the second flexible wiring member 114, wiring 118 is drawn out in the same direction as the wiring in the first connection portion 130 of the first flexible wiring member 112 such that the wiring projects from the flexible substrate 100, and is connected to a second connection portion 132 for an external drive unit. Part of the wiring 116 is omitted from the drawing. As shown in FIG. 1B, insulating barrier walls 104 are disposed between the display pixels, and the display pixels are insulated from each other.

In a method of manufacturing the first exemplary embodiment of the invention, when, for example, a display device utilizing organic electroluminescence is formed by using a low molecular material, transparent first electrodes 102 each having a strip shape and each of which is formed of ITO or the like are formed in a row on the flexible substrate 100 and, after cleaning, insulating barrier walls 104 are formed by transfer printing or the like. In succession, an organic layer 106 such as a light emitting layer is formed thereon by vacuum deposition or the like, and second electrodes 108 are formed by sputtering ITO or the like, or by vacuum deposition of Al or the like. On the other hand, when an organic layer 106 such as a light emitting layer is formed using a polymer material, the organic layer is formed by a coating method, a printing method, an ink jet method, or the like, and second electrodes 108 are then formed by sputtering ITO or the like, or by vacuum deposition of Al or the like. The organic layer 106 is formed on the first electrodes 102 and the insulating barrier walls 104, and the second electrodes 108 are formed thereon. Further, an insulating sealing film 110 is formed on the second electrodes. The periphery of the protective film 126 and the periphery of the flexible substrate are matched and adhered so as to expose the first drawn wirings 122 and the second drawn wirings 124. The first drawn wirings 122 and the first flexible wiring member 112 are attached so as to allow conduction therebetween. The second drawn wirings 124 and the second flexible wiring member 114 are also attached so as to allow conduction therebetween, and are adhered onto the protective film 126.

The first connection portion 130 of the first flexible wiring members 112 and the second connection portion 132 of the second flexible wiring members 114 may be arranged to overlap vertically in the lamination direction of the display pixels, or may be arranged in a row parallel to each other in a direction perpendicular to the lamination direction of the display pixels.

In this way, the wiring is drawn out from one side of the device. Accordingly, dead space in the substrate can be reduced.

Figure 3A:
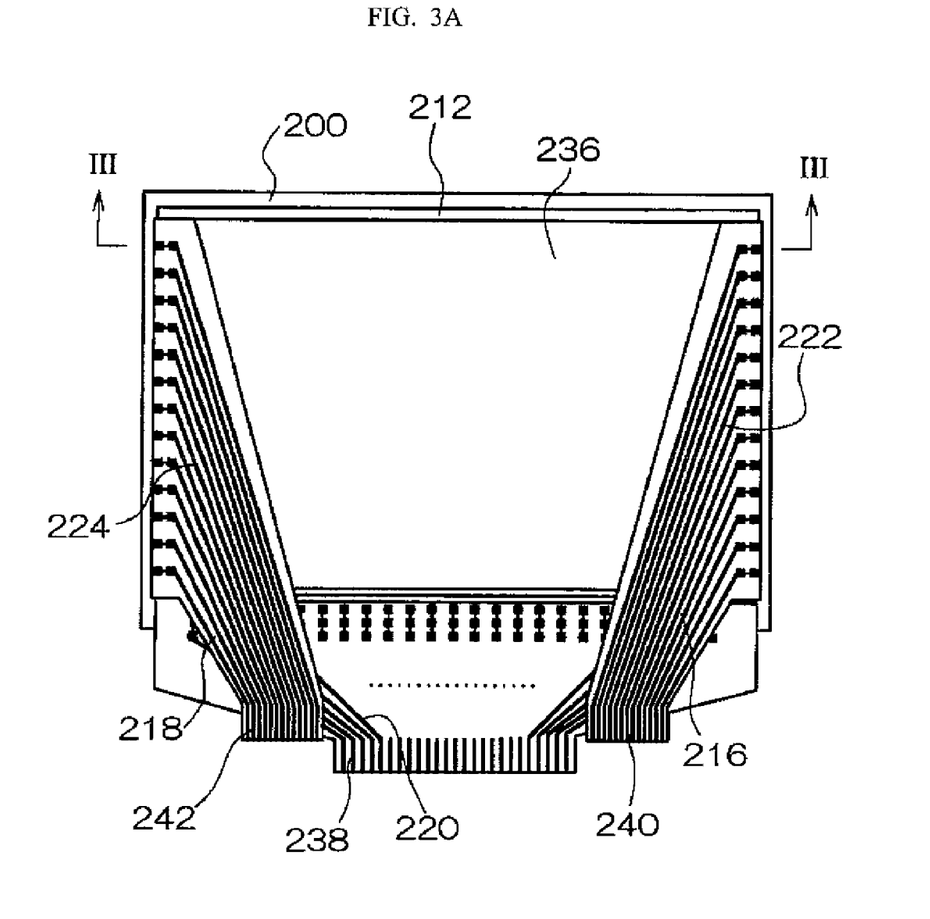
FIG. 3A is a plan view of a display device according to a second exemplary embodiment of the invention.
Figure 3B:
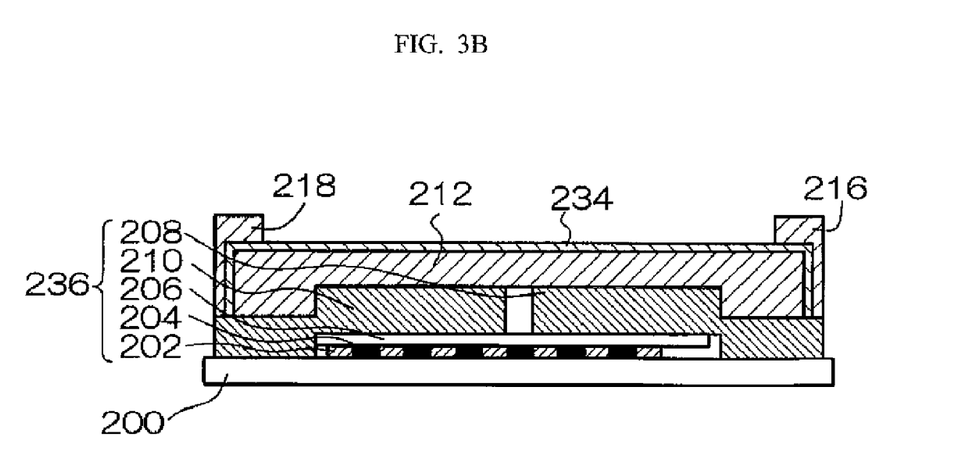
FIG. 3B is a sectional view taken along a line III-III in FIG. 3A.
Figure 4:
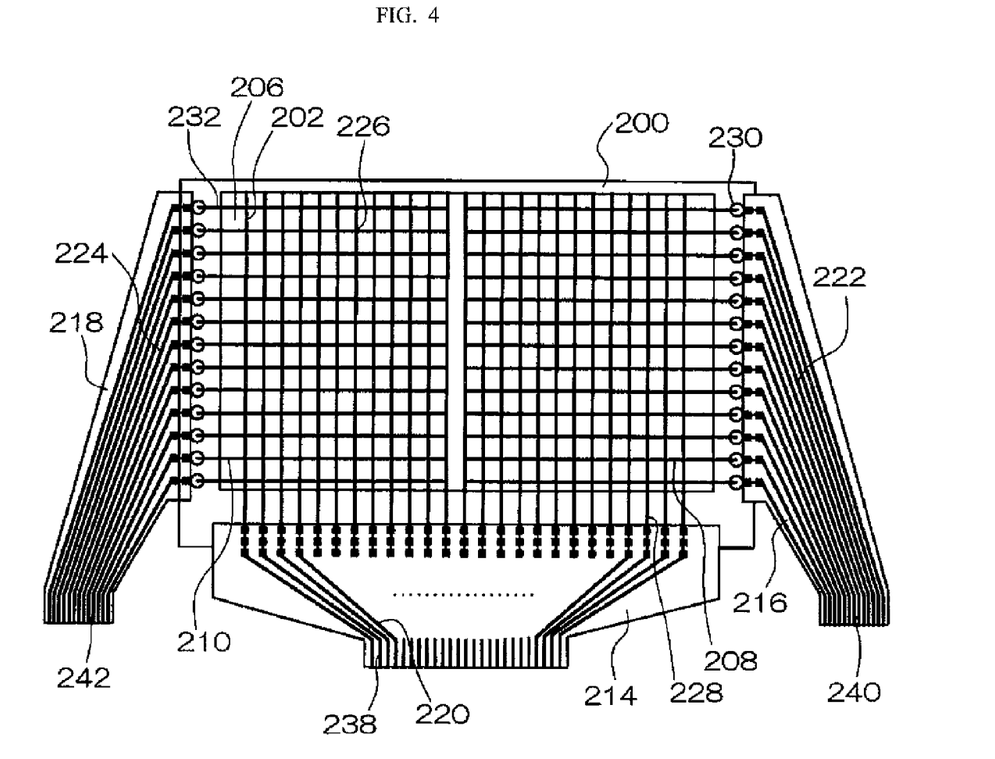
FIG. 4 is an explanatory diagram showing the layout of wiring in FIG. 3A of the display device according to the second exemplary embodiment of the invention.

FIG. 3A is a plan view showing a second exemplary embodiment of the invention. FIG. 3B is a sectional view taken along the line III-III in FIG. 3A, and FIG. 4 is an explanatory diagram showing the layout of the wiring in FIG. 3A.

Second Exemplary Embodiment

FIG. 3A shows the second exemplary embodiment of the invention in which the second electrode 108 shown in FIG. 1 showing the first exemplary embodiment is divided into two sections on the display unit, and the display unit 128, which is driven by one system in the first exemplary embodiment, is driven by two systems. FIG. 3A shows a plan view of an organic EL panel using an organic compound in the optical functional layer, and FIG. 4 shows the wirings shown in FIG. 3A.

On a flexible substrate 200, first electrodes 202 each having a strip shape are disposed in a row to form line electrodes. An organic layer 206 including an organic compound, such as a light emitting layer is laminated on the first electrodes 202. Second electrodes 208 and third electrodes 210, each of which has a strip shape, are disposed on the organic layer 206 in a row in a direction intersecting with that of the first electrodes 202 such that the organic layer 206 is interposed between the first electrodes and the second and third electrodes, the second electrodes and the third electrodes forming line electrodes. As shown in FIG. 4, the second electrodes 208 and the third electrodes 210 are formed as line electrodes in a direction intersecting with that of the first electrodes 202, being divided into two respective sections on a display unit 236. Each rectangular area of overlap between the first electrodes 202 and either of the second electrodes 208 and the third electrodes 210 in a direction substantially perpendicular to the plane of the electrodes forms a display pixel 226, and the entirety of a plurality of the display pixels 226 forms the display unit 236. The display unit 236 is covered with an insulating sealing film 212, and a protective film 234 for protecting the entire structure of the display unit 236 is adhered thereto in such a manner that the periphery of the protective film is substantially aligned and overlapped with that of the flexible substrate 200. A first drawn wiring 228, a second drawn wiring 230, and a third drawn wiring 232 which are respectively drawn out from the first electrode, the second electrode, and the third electrode from a display pixel (functional region) 226 of the display unit 236 are not covered with the protective film 234. The first drawn wiring 228, the second drawn wiring 230, and the third drawn wiring 232 are respectively connected to a first flexible wiring member 214, a second flexible wiring member 216, and a third flexible wiring member 218.

The first flexible wiring member 214 is drawn out to the same side as the first drawn wiring 228, is projected from the flexible substrate 200, and is connected to a first connection portion 238 for connecting the first flexible wiring member to an external drive unit via wiring 220. Further, the second flexible wiring member 216 and the third flexible wiring member 218 are adhered onto the protective film 234, are drawn out to the same side as the first connection portion 238 for the first flexible wiring member 214 within the region occupied by the second flexible wiring member 216 and the third flexible wiring member 218 as seen from plan view, are projected from the flexible substrate 200, and are respectively connected to a second connection portion 240 and a third connection portion 242 for connecting each of the second flexible wiring member and the third flexible wiring member to an external drive unit via wiring 222 and 224. Part of the wiring 220 is omitted from the drawing. As shown in FIG. 3B, insulating barrier walls 204 are disposed between display pixels 226, and the display pixels are insulated from each other.

In a method of manufacturing the second exemplary embodiment of the invention, the procedure is basically the same as in the first exemplary embodiment. However, the second electrode 208 and the third electrode 210 are formed by sputtering ITO or the like, or by vacuum deposition of Al or the like, in such a manner that the second electrode 108 in the first exemplary embodiment is divided into two sections on the display unit 128. The protective film 234 is formed by aligning the periphery of the protective film 234 and the periphery of the flexible substrate 200, and adhering them together so as to expose the first drawn wiring 228, the second drawn wiring 230, and the third drawn wiring 232. Then, the first drawn wiring 228 and the first flexible wiring member 214 are attached so as to allow conduction therebetween. The second drawn wiring 230 and the second flexible wiring member 216, and the third drawn wiring 232 and the third flexible wiring member 218 are attached so as to allow conduction therebetween, respectively, and the second flexible wiring member 216 and the third flexible wiring member 218 are adhered onto the protective film 234.

The first connection portion 238, the second connection portion 240, and the third connection portion 242 of the first flexible wiring member 214, the second flexible wiring member 216, and the third flexible wiring member 218 may be formed to overlap vertically in the lamination direction of the display pixels, or in a row parallel to each other in a direction perpendicular to the lamination direction of the display pixels.

Since the wirings are drawn out to only one side, dead space in the substrate may be reduced.

Figure 5A:
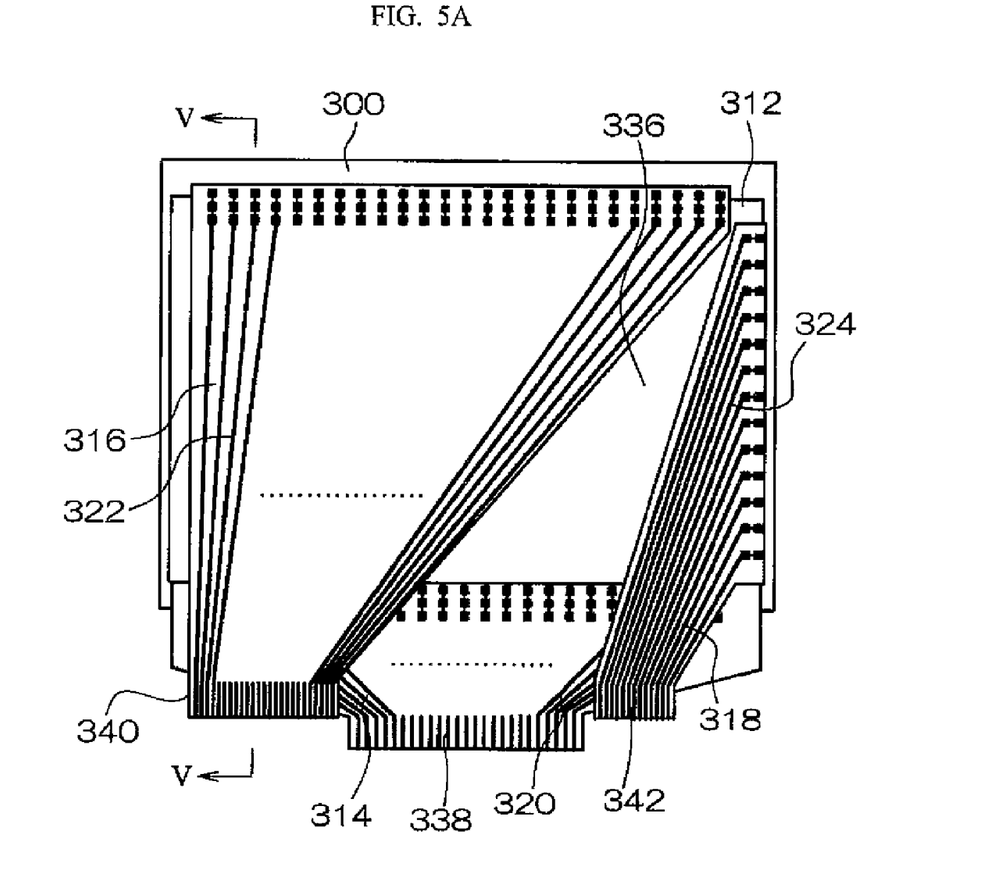
FIG. 5A is a plan view of a display device according to a third exemplary embodiment of the invention.
Figure 5B:
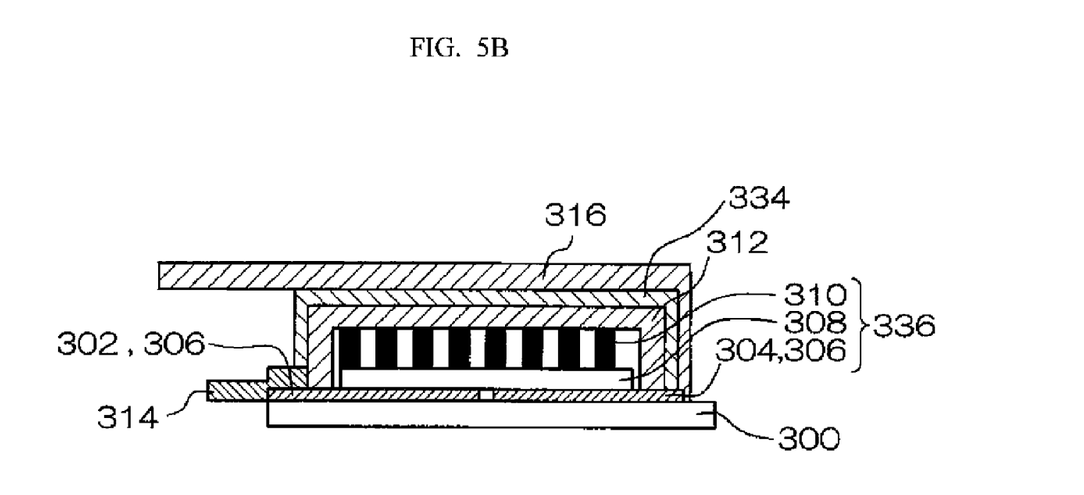
FIG. 5B is a sectional view taken along a line V-V in FIG. 5A.
Figure 6:
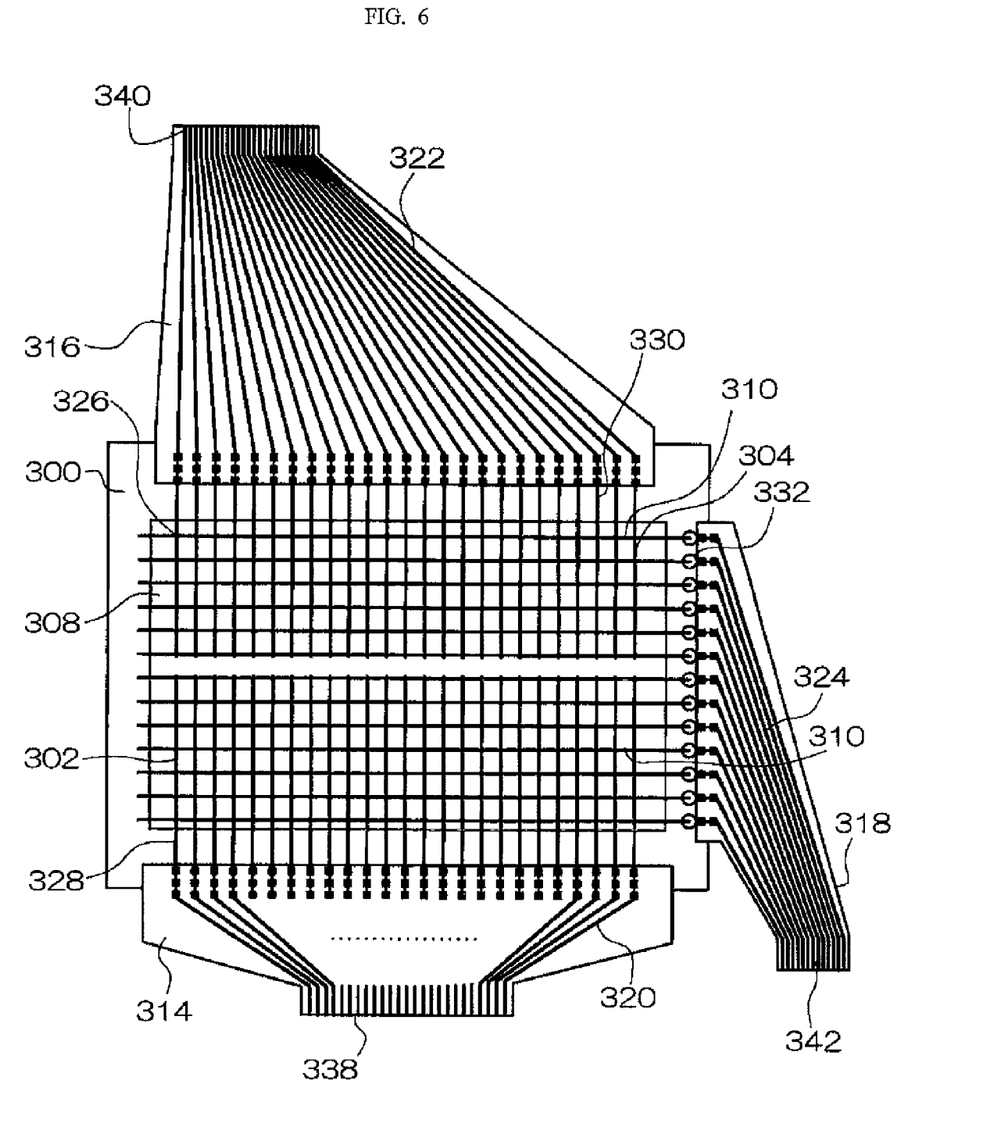
FIG. 6 is an explanatory diagram showing the layout of wiring in FIG. 5A of the display device according to the third exemplary embodiment of the invention.

FIG. 5A is a plan view showing the third exemplary embodiment of the invention. FIG. 5B is a sectional view taken along the line V-V in FIG. 5A, and FIG. 6 is an explanatory diagram showing the layout of the wiring in FIG. 5A.

Third Exemplary Embodiment

FIG. 5A shows the third exemplary embodiment of the invention which is the same as the first exemplary embodiment except that the first electrode 102 in FIG. 1 is divided into two sections on the display unit, and the display unit 128, which is driven by one system in the first exemplary embodiment, is driven by two systems in the third exemplary embodiment. FIG. 5A shows a plan view of an organic EL panel using an organic compound in the optical functional layer, and FIG. 6 shows the wiring shown in FIG. 5A.

On a flexible substrate 300, first electrodes 302 and fourth electrodes 304 each having a strip shape are disposed in a row to each form line electrodes. An organic layer 308 including an organic compound such as a light emitting layer is laminated on the first electrodes 302 and the fourth electrodes 304. Second electrodes 310 each having a strip shape are disposed in a row on the organic layer 308 in a direction intersecting with that of the first electrodes 302 or the fourth electrodes 304 such that the organic layer 308 is interposed between the second electrode and the first and fourth electrodes, the second electrodes forming line electrodes. As shown in FIG. 6, the first electrodes 302 and the fourth electrodes 304 are formed as line electrodes in a direction intersecting with that of the second electrode 310, being divided into two respective sections on a display unit 336. Each rectangular area of overlap between either of the first electrodes 302 and the fourth electrodes 304, and the second electrodes 310, in a direction substantially perpendicular to the plane of the electrodes forms a display pixel 326, and the entirety of a plurality of the display pixels 326 forms the display unit 336. The display unit 336 is covered with an insulating sealing film 312, and a protective film 334 for protecting the entire structure of the display unit 336 is adhered thereto in such a manner that the periphery of the protective film is substantially aligned and overlapped with that of the flexible substrate 300. A first drawn wiring 328, a fourth drawn wiring 330, and a second drawn wiring 332 which are respectively drawn out from the first electrode, the fourth electrode, and the second electrode from a display pixel (functional region) 326 on the display unit are not covered with the protective film 334. The first drawn wiring 328, the fourth drawn wiring 330, and the second drawn wiring 332 are respectively connected to a first flexible wiring member 314, a fourth flexible wiring member 316, and a second flexible wiring member 318. As shown in FIG. 5B, insulating barrier walls 306 are disposed between display pixels 326, and the display pixels are insulated from each other.

The first flexible wiring member 314 is drawn out in same direction as the first drawn wiring 328, is projected from the flexible substrate 300, and is connected to a first connection portion 338 for connecting the first flexible wiring member to an external drive circuit via wiring 320. Further, the fourth flexible wiring member 316 and the second flexible wiring member 318 are adhered onto the protective film 334, are drawn out in the same direction as the first connection portion 338 of the first flexible wiring member 314 within the region occupied by the fourth flexible wiring member 316 and the second flexible wiring member 318 as seen from plan view, are projected from the flexible substrate 300, and are respectively connected to a fourth connection portion 340 and a second connection portion 342 for connecting each of the fourth flexible wiring member and the second flexible wiring member to an external drive circuit via wiring 322 and 324. Part of the wiring 320 is omitted from the drawing.

The first connection portion 338, the fourth connection portion 340, and the second connection portion 342 of the first flexible wiring member 314, the fourth flexible wiring member 318, and the second flexible wiring member 316 may be formed to overlap vertically in the lamination direction of the display pixels, or in a row parallel to each other in a direction perpendicular to the lamination direction of the display pixels.

In FIG. 6, as in the first exemplary embodiment, insulating barrier walls 306 are disposed between display pixels, and the display pixels are mutually insulated from each other.

Since the wirings are drawn out to only one side, dead space in the substrate may be reduced.

In a method of manufacturing the third exemplary embodiment of the invention, the procedure is basically the same as in the first exemplary embodiment. However, the first electrode 302 and fourth electrode 304 are formed by sputtering ITO or the like, or by vacuum deposition of Al or the like in such a manner that the first electrode 102 in the first exemplary embodiment is divided into two sections on the display unit 128. The protective film 334 is formed by aligning the periphery of the protective film 334 and the periphery of the flexible substrate 300, and adhering them so as to expose the first drawn wiring 328, the fourth drawn wiring 330, and the second drawn wiring 332. Then, the first drawn wiring 328 and the first flexible wiring member 314 are attached so as to allow conduction therebetween. The fourth drawn wiring 330 and the fourth flexible wiring member 316, and the second drawn wiring 332 and the second flexible wiring member 318 are attached to allow conduction therebetween, respectively, and are adhered onto the protective film 334.

Next, Modified Example 1, which is a modified example of the first exemplary embodiment of the invention, is described.

Modified Example 1

Figure 7:
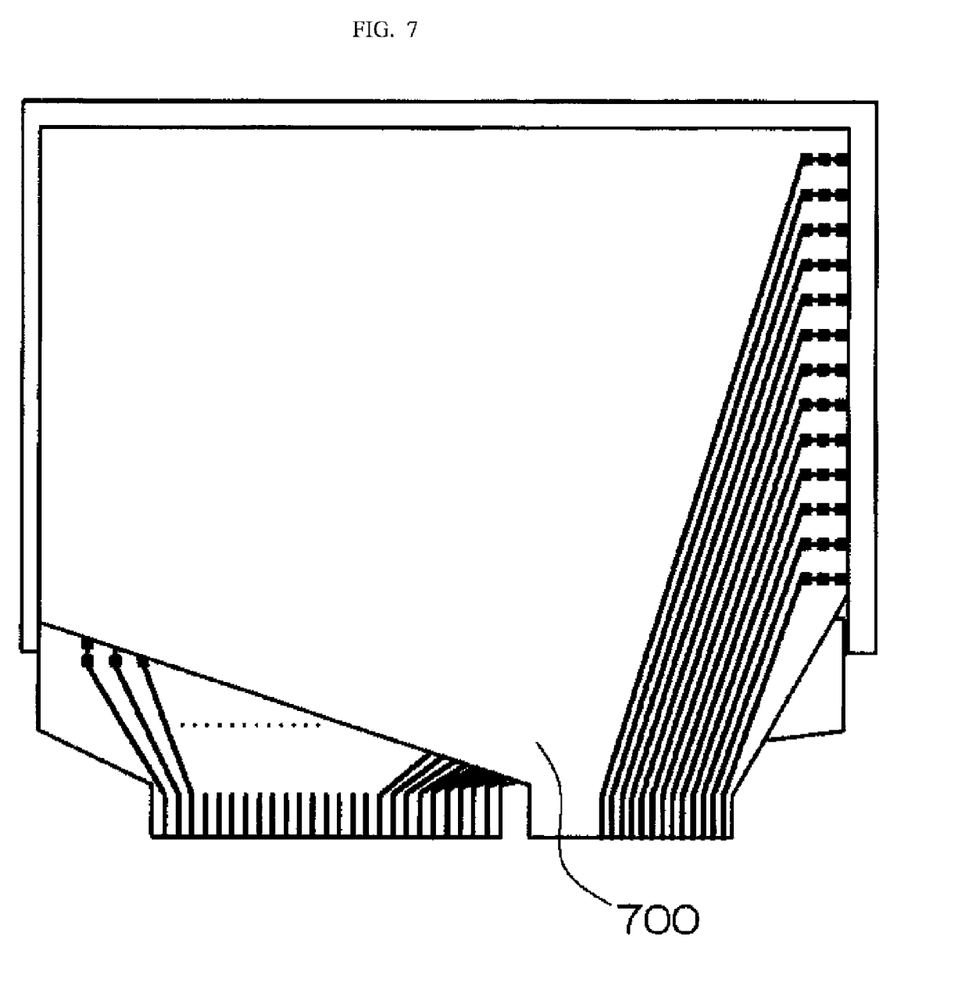
FIG. 7 is a plan view of display device in modified example 1 according to the first exemplary embodiment of the invention.

FIG. 7 is a plan view showing a display device according to Modified Example 1. Modified Example 1 has basically the same configuration as that of the display device according to the first exemplary embodiment of the invention except that the protective film 126 and the flexible wiring member 114 in the first exemplary embodiment are substituted with a flexible wiring member 700 which has a protective film function and protects the entire display unit.

The method of manufacturing Modified Example 1 is basically the same as in the first exemplary embodiment. However, in the manufacture of Modified Example 1, after the insulating sealing film 110 of the first exemplary embodiment is formed, the flexible wiring member 700 having a protective film function and the second drawn wiring 124 are attached so as to allow conduction therebetween, and the periphery of the flexible wiring member 700 and the periphery of the flexible substrate 100 are aligned and adhered so as to cover the display unit 128. At this time, the first flexible wiring member 112 is not included.

Thus, the flexible wiring member has a protective film function, the number of parts is reduced, and the display device is reduced in thickness.

Next, Modified Example 2, which is a modified example of the second exemplary embodiment of the invention, is described.

Modified Example 2

Figure 8:
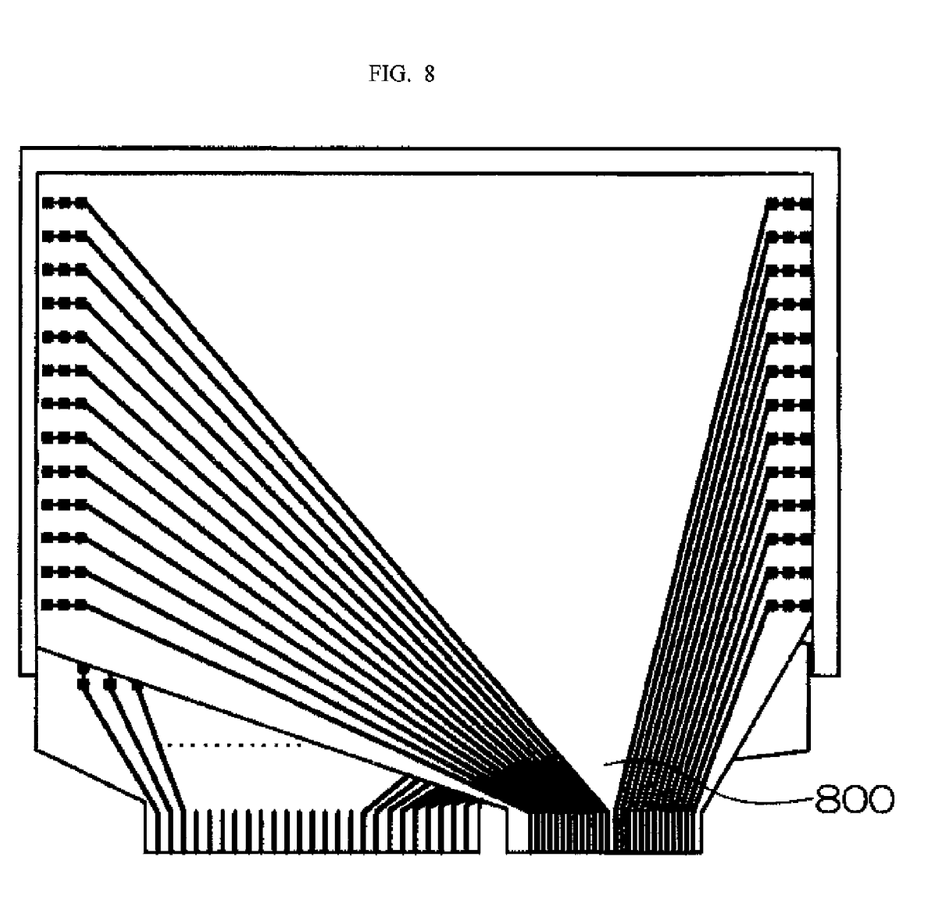
FIG. 8 is a plan view of display device in modified example 2 according to the second exemplary embodiment of the invention.

FIG. 8 is a plan view showing a display device according to Modified Example 2. Modified Example 2 has basically the same configuration as that of the display device according to the second exemplary embodiment of the invention except that the protective film 234, the second flexible wiring member 216, and the third flexible wiring member 218 in the second exemplary embodiment are substituted with a flexible wiring member 800 which has a protective film function and protects the entire display unit.

The method of manufacturing Modified Example 2 is basically the same as in the second exemplary embodiment. However, in Modified Example 2, after the insulating sealing film 212 of the second exemplary embodiment is formed, the flexible wiring member 800 having a protective film function, and the second drawn wiring 230 and the third drawn wiring 232, are respectively attached so as to allow conduction therebetween, and the periphery of the flexible wiring member 800 and the periphery of the flexible substrate 200 are matched and adhered so as to cover the display unit 236. At this time, the first flexible wiring member 214 is not included.

Thus, the flexible wiring member has a protective film function, the number of parts is reduced, and the display device is reduced in thickness.

Next, Modified Example 3, which is a modified example of the third exemplary embodiment of the invention, is described.

Modified Example 3

Figure 9:
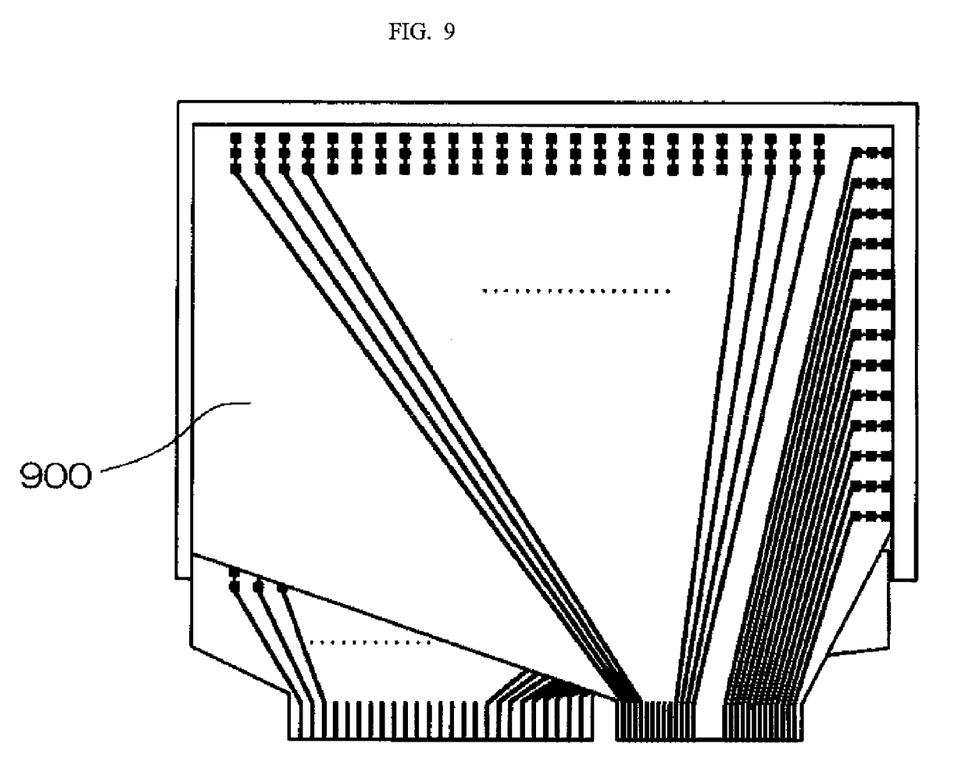
FIG. 9 is a plan view of display device in modified example 3 according to the third exemplary embodiment of the invention.

FIG. 9 is a plan view showing a display device according to Modified Example 3. Modified Example 3 has basically the same configuration as that of the display device according to the third exemplary embodiment of the invention except that the protective film 334, the fourth flexible wiring member 316, and the second flexible wiring member 318 in the third exemplary embodiment are substituted with a flexible wiring member 900 which has a protective film function and protects the entire display unit.

The method of manufacturing Modified Example 3 is basically the same as in the third exemplary embodiment. However, in Modified Example 3, after the insulating sealing film 312 of the third exemplary embodiment is formed, the flexible wiring member 900 having a protective film function, and the fourth drawn wiring 330 and the second drawn wiring 332 are respectively attached so as to allow conduction therebetween, and the periphery of the flexible wiring member 800 and the periphery of the flexible substrate 200 are matched and adhered so as to cover the display unit 336. At this time, the first flexible wiring member 314 is not included.

Thus, the flexible wiring member has a protective film function, the number of parts is reduced, and the display device is reduced in thickness.

Hereinafter, common features of the display devices according to the first to third exemplary embodiments and Modified Examples 1 to 3 of the invention are described in detail.

Examples of the optical functional layer include an organic EL element, a liquid crystal element, a horizontal electrophoresis device for allowing charged particles to move in horizontal directions (in-plane direction), and a microcapsule type electrophoresis device. Among these, the organic EL element and the liquid crystal element are preferably used, and the organic EL element is particularly preferably used.

Flexible Substrate

The flexible substrate to be used in the display device may be selected as appropriate from known materials. Examples thereof include polymer films formed of engineering plastics or the like, and metal foils formed of stainless steel or the like. Examples of the engineering plastics include polyimide, polyethylene terephthalate, polyethylene naphthalate, polyether sulfone, acrylonitrile-butadiene-styrene copolymers, vinyl chloride resins, fluororesins, polyacetal resins, polyamide resins, thermoplastic polyurethane elastomers, thermoplastic elastomers, polyether ether ketone, polyethylene, polycarbonate, polystyrene, and supporting bodies disclosed in JP-A No. 9-1950. In particular, polyethylene naphthalate and polyether sulfone may preferably be used.

The shape of the flexible substrate is not particularly limited, and the flexible substrate may have any shape as long as the first electrode and the second electrode can be disposed in different directions from each other on or above thereof. Typically, a substantially rectangular flexible substrate is preferably used as the shape of the flexible substrate.

Protective Film

The protective film to be applied in the invention may be selected as appropriate from known materials. Examples thereof include polymer films formed of engineering plastics or the like. Examples of the engineering plastics include polyimide, polyethylene terephthalate, polyethylene naphthalate, polyether sulfone, acrylonitrile-butadiene-styrene copolymers, vinyl chloride resins, fluororesins, polyacetal resins, polyamide resins, thermoplastic polyurethane elastomers, thermoplastic elastomers, polyether ether ketone, polyethylene, polycarbonate, polystyrene, and supporting bodies disclosed in JP-A No. 9-1950. In particular, polyimide, polyethylene naphthalate, and polyether sulfone may preferably be used.

Flexible Wiring Member

The flexible wiring member applied in the invention is a member on which wiring is provided, and may be selected as appropriate from known materials. Examples thereof include polymer films formed of engineering plastics or the like. Examples of the engineering plastics include polyimide, polyethylene terephthalate, polyethylene naphthalate, polyether sulfone, acrylonitrile-butadiene-styrene copolymers, vinyl chloride resins, fluororesins, polyacetal resins, polyamide resins, thermoplastic polyurethane elastomers, thermoplastic elastomers, polyether ether ketone, polyethylene, polycarbonate, polystyrene, and supporting bodies disclosed in JP-A No. 9-1950. In particular, polyimide, polyethylene naphthalate, and polyether sulfone may preferably be used.

When display is performed at the flexible wiring member surface side, a transparent substrate may be selected as appropriate from the above examples of materials of the flexible wiring member.

The wiring to be provided on the flexible wiring member may be selected as appropriate from known materials. Examples thereof include aluminum, copper, gold, silver, chromium, and indium tin oxide (ITO). In particular, copper and silver may preferably be used.

To adhere the flexible wiring member to the substrate and connect to the drawn wiring, any known method may be selected as appropriate. For example, the flexible wiring member and the drawn wiring on the substrate may be connected by inserting an anisotropic conductive film (ACF) therebetween, followed by heating and compressing.

Features Related to the Display Unit and Drawn Wiring

The display unit of the display device of the invention has at least one display pixel, and the drawn wiring is drawn out from the electrode of the display unit.

In the invention, each display pixel portion of a display unit having a laminated structure may be formed such that each display pixel has a different color hue, and thus a display medium of the invention may be enabled to accommodate multicolor display.

Adhesive Layer

The adhesives to be used for the adhesive layer between the flexible substrate and the protective film may be selected as appropriate from known materials. Examples of the adhesives include phenol formaldehyde, phenol elastomers, phenol polyamide, phenol epoxy, urea formaldehyde, melamine formaldehyde, epoxy resins, isocyanate resins, furan resins, and resorcin formaldehyde.

Insulating Sealing Film

The insulating sealing film to be applied in the invention is laminated so that the drawn wiring may be exposed at the display pixel positioned at the highest part of the laminated structure. The insulating sealing film may be selected as appropriate from known materials. Examples thereof include silicon nitride, silicon nitride-oxide, silicon oxide, and aluminum oxide.

Electrode

The electrode to be applied in the invention may be selected as appropriate from known materials. Examples thereof include a metal electrode, a transparent electrode having excellent transmission of visible light, and a conductive compound. Examples of the materials for the metal electrode include alkali metals (e.g. Li, Na, K or Cs), alkaline earth metals (e.g. Ma or Ca), gold, silver, lead, aluminum, sodium-potassium alloys, lithium-aluminum alloys, magnesium-silver alloys, indium, and rare earth metals such as ytterbium. Any one of these may be used alone, or two or more of these may favorably be used in combination. The transparent electrode may be formed by using metal oxides such as indium tin oxide (ITO) or $SnO_2$.

The display device of the invention has a cathode and an anode on a substrate, and has an optical functional layer including an organic light emitting layer (simply referred to as a light emitting layer in the following) disposed between the two electrodes. In view of the properties of the light emitting device, at least one electrode of the anode and the cathode is preferably transparent.

The display device of the invention may be a bottom emission type which emits light from the anode side, or a top emission type which emits light from the cathode side (see JP-A Nos. 2003-208109, 2003-248441, 2003-257651, and 2003-282261).

In an embodiment of the laminated structure of the organic compound layer in the optical functional layer in the invention, a hole transport layer, a light emitting layer, and an electron transport layer are formed from the anode side. Further, a charge blocking layer or the like may be formed between the hole transport layer and the light emitting layer, or between the light emitting layer and the electron transport layer. A hole injection layer may be disposed between the anode and the hole transport layer, and the electron injection layer may be disposed between the cathode and the electron transport layer.

The hole injection layer or the hole transport layer may include an electron accepting dopant. The electron accepting dopant may be an organic compound or an inorganic compound as long as the compound accepts an electron and is capable of oxidizing an organic compound.

The electron injection layer or the electron transport layer may include an electron donating dopant. The electron donating dopant may be an electron donating compound capable of reducing an organic compound. Preferred examples thereof include alkali metals, alkaline earth metals, transition metals including rare earth metals, and reductive organic compounds.

Organic Light Emitting Layer

The organic light emitting layer is a layer having the functions of receiving holes from an anode, a hole injection layer, or a hole transport layer, receiving electrons from a cathode, an electron injection layer, or an electron transport layer, and providing a region where re-bonding of the holes and the electrons are carried out to emit light upon application of an electric field.

The light emitting layer of the invention may be formed of a light emitting material alone, or may be a mixed layer of a host material and a light emitting material. The light emitting material may be either a fluorescent material or a phosphorescent material. One light emitting material may be used, or two or more light emitting materials may be used. The host material is preferably a charge transport material. One host material may be used, or two or more host materials may be used. One example of a combined structure is a mixture of an electron transport host material and a hole transport host material. Further, the light emitting layer may contain a material having no charge transporting property and not able to emit light.

The light emitting layer may be formed in one layer, or may be divided into plural light emitting layers such as a first light emitting layer, a second light emitting layer, and a third light emitting layer. Each of the layers may be divided into plural sub-layers. The layers may emit light of the same color, or may emit light of different colors.

Examples of the fluorescent material to be used in the invention are not particularly limited, and may be selected from known materials. Examples thereof include those disclosed in paragraph [0067] of JP-A No. 2004-146067 and paragraph [0068] of JP-A No. 2004-103577, but the invention is not limited to these examples.

Examples of the phosphorescent material to be used in the invention are not particularly limited, and may be selected from known materials. Examples thereof include those disclosed in paragraphs [0070] and [0071] of JP-A No. 221068, but the invention is not limited to these examples.

In order to improve the luminous efficiency, the display device in the invention may have a structure in which a charge generating layer is included between plural light emitting layers.

The charge generating layer has the function of generating a charge (i.e., holes and electrons) upon application of an electric field, together with the function of injecting the generated charge into a layer adjacent to the charge generating layer.

The material for forming the charge generating layer may be any material having these functions, and may be formed of a single compound or a plurality of compounds.

Specifically, the material may be a conductive material, a semiconductive material such as a doped organic layer, or an electrically insulating material. Examples thereof include those disclosed in JP-A Nos. 11-329748, 2003-272860, 2003-45676, 2004-39617, and U.S. Pat. Nos. 6,337,492, 6,107,734, and 6,872,472.

The material for forming the insulating barrier wall of the invention may be selected from any known organic materials or inorganic materials.

The method of manufacturing the insulating barrier wall using an organic material is not particularly limited. In this case, preferable examples of the material include photosensitive resins and thermosetting resins, and the insulating barrier wall is manufactured by melting the resin or dissolving the resin in a solvent, applying the resin, and then applying an ultraviolet ray or a visible ray or heating the resin. The insulating barrier wall may also be formed by transferring the organic material.

The method of manufacturing the insulating barrier wall using an inorganic material is not particularly limited. In this case, preferable examples of the material include silicon nitride, silicon oxide-nitride, silicon oxide, and silicon carbide, and the insulating barrier wall is manufactured by the CVD method, ion plating method, sputtering method, or vapor deposition method.

Each of the layers of the display device of the invention may be formed by any known method such as a dry film forming process such as a vapor deposition method or sputtering method, and a wet film forming process such as a dipping method, spin coat method, dip coat method, casting method, die coat method, roll coat method, bar coat method, or gravure coat method.

The light emission efficiency of the display device of the invention may be increased by any known method. For example, the light emission efficiency may be increased by processing the substrate surface (for example, forming fine undulation patterns), controlling the refractive indices of the substrate, the ITO layer, and the organic compound layer, or controlling the film thickness of the substrate, the ITO layer, or the organic compound layer, to thereby increase the external quantum efficiency.

In the display device of the invention, a direct current (which, if desired, may include an alternating current component) voltage (usually in a range of 2 to 15 V) or a direct current is applied between the anode and the cathode, whereby light emission can be obtained.

As a driving method of the display device in the invention, the driving methods described in each of JP-A Nos. 2-148687, 6-301355, 5-29080, 7-134558, 8-234685, and 8-241047, Japanese Patent No. 2784615, U.S. Pat. Nos. 5,828,429 and 6,023,308 or the like can be applied.

The display medium of the invention may be preferably applied to a flexible display, flexible lighting, a wearable display, or the like.

What is claimed is:

1. A display device comprising:
a plurality of line electrodes including at least a first electrode and a second electrode, the first electrode and the second electrode being disposed in different directions from each other on or above a flexible substrate;
an optical functional layer disposed between the first electrode and the second electrode; and
a display unit having a display pixel formed at each area of overlap between the first electrode and the second electrode in a direction substantially perpendicular to the plane of the electrodes,
wherein the first electrode is connected to a first flexible wiring member at a first region at a periphery of the flexible substrate,
the second electrode is connected to a second flexible wiring member at a second region at the periphery of the flexible substrate that is different from the first region,
either the first flexible wiring member or the second flexible wiring member is adhered onto the display unit formed on the flexible substrate, and
a first connection portion and a second connection portion are disposed at the same region at the periphery of the flexible substrate, wherein the first connection portion connects the first flexible wiring member adhered onto the display unit with a first external drive unit, and the second connection portion connects the second flexible wiring member with a second external drive unit, or the first connection portion connects the second flexible wiring member adhered onto the display unit with the second external drive unit, and the second connection portion connects the first flexible wiring member with the first external drive unit.

2. The display device of claim 1, wherein the flexible substrate is substantially rectangular.

3. The display device of claim 1, wherein the flexible wiring member adhered onto the display unit functions as a protective film for protecting the entire display unit.

4. The display device of claim 1, wherein:
the second electrode is divided into two sections on the surface of the display unit between the second region at the periphery of the flexible substrate and a third region at the periphery opposite to the second region to form a second electrode and a third electrode;
the first electrode is connected to the first flexible wiring member at the first region at the periphery of the flexible substrate;
the second electrode is connected to the second flexible wiring member at the second region at the periphery of the flexible substrate;
the third electrode is connected to a third flexible wiring member at the third region at the periphery of the flexible substrate;
two of the first flexible wiring member, the second flexible wiring member, and the third flexible wiring member are adhered onto the display unit; and
the first connection portion for connecting the first flexible wiring member with the first external drive unit, the second connection portion for connecting the second flexible wiring member with the second external drive unit, and a third connection portion for connecting the third flexible wiring member with a third external drive unit are disposed at the same region at the periphery of the flexible substrate.

5. The display device of claim 1, wherein:
the first electrode is divided into two sections on the surface of the display unit between the first region at the periphery of the flexible substrate and a fourth region at the periphery opposite to the first region to form a first electrode and a fourth electrode;
the first electrode is connected to the first flexible wiring member at the first region at the periphery of the flexible substrate;
the fourth electrode is connected to a fourth flexible wiring member at the fourth region at the periphery of the flexible substrate:
the second electrode is connected to the second flexible wiring member at the second region at the periphery of the flexible substrate;
two of the first flexible wiring member, the fourth flexible wiring member, and the second flexible wiring member are adhered onto the display unit; and
the first connection portion for connecting the first flexible wiring member with the first external drive unit, the second connection portion for connecting the second flexible wiring member with the second external drive unit, and a fourth connection portion for connecting the fourth flexible wiring member with a fourth external drive unit are disposed at the same region at the periphery of the flexible substrate.

6. The display device of claim 3, wherein one of the flexible wiring members has a function of the second flexible wiring member, is connected to an electrode at least at two regions of the periphery of the flexible substrate, and is adhered onto the display unit formed on the flexible substrate, and the one of the flexible wiring members protects the entire display unit.

7. The display device of claim 1, wherein the display unit is sealed with an insulating sealing film.

8. The display device of claim 1, wherein the display unit is covered with a flexible protective film.

9. The display device of claim 1, wherein the display device is controlled by passive matrix driving.

10. The display device of claim 1, wherein the optical functional layer is an organic electroluminescence element including an organic compound and a light emitting layer.

11. The display device of claim 1, wherein the flexible wiring members are transparent, and the electrodes provided on the flexible wiring members are transparent.

12. The display device of claim 1, wherein the space occupied by all constituents of a display of the display unit is minimized.

13. The display device of claim 1, wherein the first flexible wiring member and the second flexible wiring member are housed in a smaller space.

* * * * *